No. 681,541. Patented Aug. 27, 1901.
F. X. L. GOSIENIECKI.
CLOSET BOWL.
(Application filed Oct. 23, 1900.)
(No Model.)

WITNESSES:

INVENTOR
Francis X. L. Gosieniecki.
BY
ATTORNEYS

UNITED STATES PATENT OFFICE.

FRANCIS X. L. GOSIENIECKI, OF NEW YORK, N. Y.

CLOSET-BOWL.

SPECIFICATION forming part of Letters Patent No. 681,541, dated August 27, 1901.

Application filed October 23, 1900. Serial No. 34,006. (No model.)

*To all whom it may concern:*

Be it known that I, FRANCIS X. L. GOSIENIECKI, a subject of the Emperor of Germany, and a resident of the city of New York, borough of Manhattan, in the county and State of New York, have invented a new and useful Improvement in Closet-Bowls, of which the following is a full, clear, and exact description.

The purpose of this invention is to so construct a water-closet bowl that a receptacle located exteriorly of the bowl will form an integral portion thereof and the interior of the receptacle will be in direct communication with the interior of the bowl, the receptacle occupying such position that when the bowl is flushed the receptacle also will receive a supply of water. This receptacle may be utilized as a cuspidor and also when filled with clean water may be utilized for cleansing the exposed parts of the person, and, further, in attendance upon aged or sick persons or children for cleansing the person.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
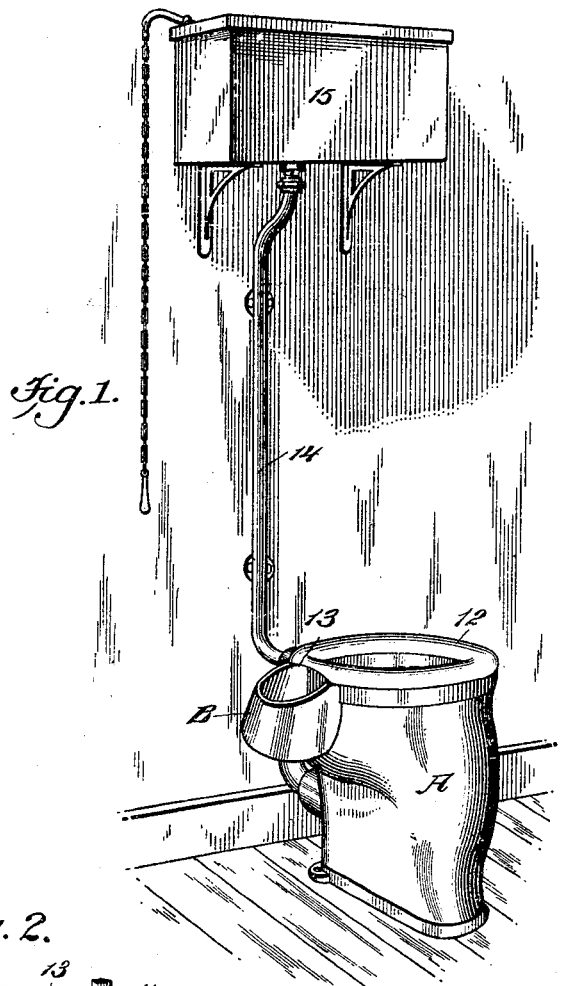
Figure 2:
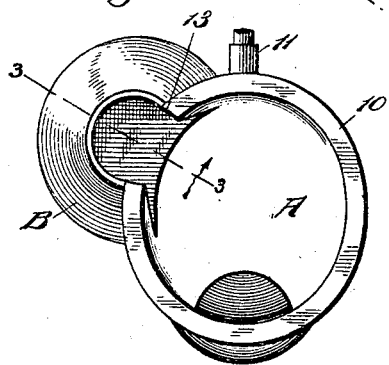
Figure 3:
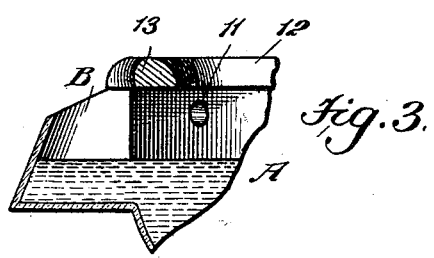

Figure 1 is a perspective view of a closet-bowl having the improvement applied. Fig. 2 is a plan view of the improved bowl with the seat removed, and Fig. 3 is a partial vertical section through the bowl and through the seat located on the bowl.

The bowl A may be of any approved construction and is provided with the usual upper flange 10. At one or at both sides of the said bowl, usually at one side, an extension-receptacle B is formed which is an integral portion of the bowl, and this receptacle is located adjacent to the flushing-pipe 11, so that when the water is supplied to the bowl A from any suitable source said water will also extend into the extension-receptacle B, since this receptacle at its inner portion is in full communication with the interior of the bowl A proper. In fact, the flange or rim 10 of the bowl A is a continuation of the top of the extension-receptacle, so that the space between the inner walls of said extension-receptacle where it connects with the bowl A is open from top to bottom, as is best shown in Fig. 2. This extension B is preferably so made that its upper edge dips or is curved downward in an outward direction, the central portion of the outer wall of the extension-receptacle B being of less height than the height of the wall connecting with the bowl A, as is shown in Fig. 1. Furthermore, the said extension-receptacle is given an outward and downward inclination to a greater or less extent, as shown in Fig. 3, so that the extension-receptacle is of much greater width at the bottom than at the top, enabling the greatest possible amount of water to be received in the said extension-receptacle. The seat 12, which may be of any desired character, rests, as usual, on the top flange 10 of the closet-bowl, and that portion of the seat 12 which extends across the extension-receptacle B is provided with a recess or cut-away portion 13 in its outer face, so as to enable a person to readily introduce the hand and forearm into the said extension-receptacle and pass the hand into the closet-bowl.

It will be observed that the water which is supplied to the closet-bowl is likewise supplied to the extension-receptacle B, and this receptacle may be utilized as a cuspidor. When water is first flushed into the bowl, the water entering the bowl will also enter the extension-receptacle B and clean it out, and when the water is again flushed in the bowl and the extension-receptacle B receive another supply of water. This water may be utilized for cleaning the exposed portions of the person, the hand and forearm of the operator being readily introduced into the extension-receptacle for that purpose, the top of which receptacle is entirely open.

In Fig. 1 the bowl A is shown as connected with the usual water-supply pipe 14, which pipe in its turn is shown connected with a flushing-tank 15.

Having thus described my invention, I claim as new and desire to secure by Letters Patent—

1. A water-closet bowl having an extension-receptacle in direct communication from top to bottom with the interior of the bowl and accessible from the outside so that water supplied to the bowl will also be supplied to said receptacle and so that the hand and forearm of a person seated upon the bowl may be introduced into the receptacle and bowl without rising, enabling the contents of the receptacle being applied directly to the person for hygienic purposes.

2. A water-closet bowl provided with an extension-receptacle having downwardly-flaring sides and a downwardly-inclined upper edge, the forward portion of said extension-receptacle being in direct communication with the closet-bowl and said extension-receptacle being also a continuation of a side portion of the bowl, the receptacle having its top completely open, and a seat located on the bowl and crossing said extension-receptacle, that portion of the seat crossing the receptacle being recessed at its outer portion to permit the ready passage of the hand and arm into the extension-receptacle and through said extension-receptacle into the bowl, for the purposes set forth.

In testimony whereof I have signed my name to this specification in the presence of two subscribing witnesses.

FRANCIS X. L. GOSIENIECKI.

Witnesses:
J. FRED. ACKER,
JNO. M. RITTER.